United States Patent
Mieck et al.

(12) 
(10) Patent No.: US 6,548,167 B1
(45) Date of Patent: Apr. 15, 2003

(54) CONTINUOUS-STRAND PELLETS AND METHOD AND DEVICE FOR PREPARING CONTINUOUS-STRAND PELLETS

(75) Inventors: Klaus-Peter Mieck, Rudolstadt (DE); Thomas Reussmann, Rudolstadt (DE)

(73) Assignee: Ostthuringische Materialprufgesellshaft fur Textil und Kunststoffe mbH, Rudolstadt (DE)

( * ) Notice: Subject to any disclaimer, the term of this patent is extended or adjusted under 35 U.S.C. 154(b) by 0 days.

(21) Appl. No.: 09/700,597

(22) PCT Filed: Mar. 2, 2000

(86) PCT No.: PCT/DE00/00706

§ 371 (c)(1),
(2), (4) Date: Jan. 10, 2001

(87) PCT Pub. No.: WO00/58064

PCT Pub. Date: Oct. 5, 2000

(30) Foreign Application Priority Data

Mar. 25, 1999 (DE) .......................................... 299 05 499

(51) Int. Cl.$^7$ ................................................. D02G 3/00
(52) U.S. Cl. ...................... 428/371; 428/357; 428/362; 428/359; 428/369; 428/377; 428/293.1

(58) Field of Search .................................. 428/357, 362, 428/397, 400, 401, 364, 371, 377, 293.1

(56) References Cited

U.S. PATENT DOCUMENTS

| | | | |
|---|---|---|---|
| 5,356,581 A | 10/1994 | Stuart | 264/103 |
| 5,435,709 A | 7/1995 | Grigsby, Jr. et al. | 425/103 |
| 5,725,954 A | * 3/1998 | Montsinger | 428/397 |

FOREIGN PATENT DOCUMENTS

| | | |
|---|---|---|
| DE | 19711247 | 12/1997 |
| EP | 0703065 | 3/1996 |
| WO | 8501691 | 4/1985 |

* cited by examiner

Primary Examiner—Merrick Dixon
(74) Attorney, Agent, or Firm—Edwin D. Schindler

(57) ABSTRACT

A continuous fiber granulate material includes granulate particles having reinforcing staple fibers helically arranged in a thermoplastic matrix. The reinforcing staple fibers are located in a sheathed zone of the granulate particles along with a melted matrix material, with the granulate further including a core zone having unmelted thermoplastic staple fibers. The continuous fiber granulates have good free-flowing properties and a uniform distribution of reinforcing fibers.

21 Claims, 1 Drawing Sheet

CONTINUOUS-STRAND PELLETS AND METHOD AND DEVICE FOR PREPARING CONTINUOUS-STRAND PELLETS

BACKGROUND OF THE INVENTION

Technical Field of the Invention

The invention relates to a continuous fiber granulate comprising of granulate corns in which reinforcing staple fibers are helically arranged in a thermoplastic matrix. The invention also relates to a procedure for manufacturing continuous fiber granulate out of a staple fiber mixture of thermoplastic fibers and reinforcing fibers, in which a fiber strip comprised of the staple fiber mixture is guided through a preheating zone, then extruded through a heating nozzle into a strand, and the strand is cut into continuous fiber granulate sections after rotation and consolidation via cooling. Finally, the invention relates to a device for manufacturing continuous fiber granulate out of a staple fiber mixture of thermoplastic fibers and reinforcing fibers with a preheating zone, a heating nozzle, a cooling zone, a rotating element and a granulator.

Chopped fiber-containing granulates are manufactured by compounding reinforcing fibers and the respective matrix material using an extruder. The reinforcing fibers can be metered into the extruder continuously or chopped. The shearing action of the endless screws shortens the reinforcing fibers. At the same time, the reinforcing fibers are finely distributed in the polymer melt and cross-linked with the matrix material. The reinforcing fibers have no aligned orientation in the granulate corn. In these chopped-fiber granulates, the fiber length of the reinforcing fibers is generally smaller than the granulate length, normally lying under one millimeter.

DESCRIPTION OF THE PRIOR ART

Continuous fiber granulates are increasingly being used in the plastics-processing industry for the manufacture of slightly stiff fiber composite components. These continuous fiber granulates can basically be manufactured in different ways. One long-established method is the pultrusion procedure. This procedure is based on the continuous feeding of reinforcing fiber strands (rovings) into a tool while simultaneously supplying melted matrix material. In ideal cases, the polymer melt penetrates through the rovings, and the individual filaments are sheathed with a melt film. At the tool outlet, the strand is passed through a nozzle, giving rise to a defined cross-section. After this, the matrix material is cooled, and the material strand is cut to length. The fiber length in a granulate fabricated in this way corresponds to the granulate length due to the stretched position of the fibers.

The melt pultrusion procedure is known in numerous variations, and is used both for manufacturing continuous fiber granulate and fabricating semi-finished products (Japanese Patent Application 08-047924; Japanese Patent Application No. 06-320536; U.S. Pat. No. 3,993,726; United Kingdom Patent Specification No. 1,439,327; Japanese Patent Application No. 06-315931.) Also known are pultrusion procedures for prepreg processing. In these special pultrusion procedures, melted polymer material need not be supplied, provided that pre-impregnated reinforcing fiber rovings (prepregs) are used.

Also known is the manufacture of continuous fiber granulates using the extrusion procedure (Japanese Patent Application No. 06-254,847.) In this case, a kinking or entanglement of reinforcing fibers can make the length of individual fibers greater than the granulate length. However, most of the reinforcing fibers are shorter than the granulate length owing to the shearing action of the extruder screws.

However, specific reinforcing fiber compositions (rovings or free-flowing continuous fibers) are always necessary for manufacturing continuous fiber granulate in a pultrusion or extrusion process. This cannot be accomplished with all reinforcing fibers.

In addition to the long-known procedures for continuous fiber granulate manufacture, another procedure was also developed for the manufacture of continuous fiber pellets out of fiber strips Federal Republic of Germany Patent No. 197 11 247. This procedure is based on the principle of forming a heated, rotated material strand out of a staple fiber strip, which can then be cooled and cut into pellet sections. In this procedure, the strand is rotated with two rotating elements that rotate at the same speed. The disadvantage to this procedure is that strand rotation is only constant between the two rotating elements. After the strand passes through the second rotating element and is clamped in the granulator, it might rotate in the reverse direction given an inadequate cooling and fixation of the material. This has a negative influence on the strength and free-flowing properties of the granulate.

SUMMARY OF THE INVENTION

The object of this invention is to provide a continuous fiber granulate that has good free-flowing properties, enables a uniform distribution of reinforcing fibers, and incorporates as large a reinforcing fiber length as possible at the given cut length of the granulate corn. In addition, a procedure for manufacturing continuous fiber granulate out of a staple fiber mixture of thermoplastic fibers and reinforcing fibers is to be provided in which the expended energy is lowered. In particular, this procedure is intended to avoid the reverse rotation by the strand after passing the cooling zone. Additional advantages of the invention are mentioned in the description below.

This object is achieved according to the invention for the continuous fiber granulate mentioned at the outset by having the reinforcing staple fibers be located in a sheathed zone of the particles along with the melted matrix material, and in a core zone of the particles along with unmelted thermoplastic staple fibers. The main advantage to this granulate is that reinforcing fibers can be incorporated into the granulate corn with a greater fiber length than the granulate section length. It was surprisingly shown that reinforcing fibers with a fiber length greater than the granulate corn section length due to torsion can be incorporated into the particle even if the strand or granulate corn is not melted through in the core area. In addition, it was shown that, despite the only partial melting of the thermoplastic portion (in the sheath or edge zone), no separation takes place between the reinforcing fibers and matrix material, i.e., the reinforcing fiber load remains essentially the same in the sheath and core. This makes it possible to achieve a very uniform distribution of the reinforcing fibers in the mold units during later processing of the granulate. The energy expended to manufacture the continuous fiber granulates according to the invention is less than during extrusion or pultrusion (the manufacture of conventional granulates), since the thermoplastic polymer material need not be completely melted, but rather only the outside sheath of the strand or granulate corn.

The granulate particles are preferably strand sections, and the length of their reinforcing fibers is greater than the length of the strand sections. The ratio between the lengths of the reinforcing fibers and strand sections depends on the torsion of the strand, and rises as twisting increases. The diameter of the granulate particles generally ranges from 1 to 10 mm. The percentage of reinforcing fibers in the granulate particles can lie in a range of 10 to 80%w/w. The number of reinforcing fiber windings in the granulate particles can vary within broad limits, and generally lies within a range of 0.1 to 5.

The reinforcing staple fibers can be natural fibers, synthetic fibers or mineral fibers. Suitable fibers include flax, hemp and jute fibers, along with glass, aramide and carbon fibers. In particular, the material of the matrix and thermoplastic fibers can include of polypropylene, polyethylene and polyamide.

The object is additionally achieved according to the invention in the procedure mentioned at the outset by first cooling the strand exiting the heating nozzle, then rotating and withdrawing it, and subsequently allowing it to rotate freely as it is cut into sections with no impediment. As opposed to the procedure described in Federal Republic of Germany Patent No. 197 11 247, the strand is twisted in conjunction with the withdrawal after cooling is complete, i.e., consolidation. Strand twisting extends through the cooling zone into the heating nozzle, and is limited by friction against the nozzle all. The design of the granulator ensures that the strand can freely rotate even during the cutting process. A reverse rotation of the strand in the area between the rotating element and granulator is avoided, thereby avoiding a reduction in the free-flowing properties and strength of the granulate particles.

In the preferred embodiment of the procedure, the thermoplastic fiber portion of the fiber strip is melted in the preheating zone only in a sheath area. This not only saves on heating energy, but also accelerates the procedure, because warming and recooling take less time. Even though the core is not melted, the fibers are sufficiently stabilized in a twisted form therein.

It is best to use a ratio of speed to withdrawal rate ranging from 10 to 150 revolutions per meter for the strand. In particular, this ratio lies between 20 and 60 revolutions per meter.

The reinforcing fiber percentage in the fiber strip preferably lies within the range of 10 to 80%w/w, in particular between 15 and 50%w/w. An average reinforcing fiber length in the fiber strip ranging from 30 to 200 mm is best selected. The fineness of the fiber strip generally ranges from 5 to 30 ktex. The strand is preferably cut to a length ranging from 1 to 30 mm, with this length in particular lying between 10 and 30 mm.

Finally, the object is achieved in the device defined at the outset by having the rotating element that generates the strand torsion be arrange behind the cooling zone and also be designed as the withdrawal element for the strand, and by having the granulator exert no torque, or at most a torque without permanent reverse rotation, on the strand during the separation process. The granulator is preferably set up to execute essentially torque-free cutting operations. Avoiding the reverse rotation yields a granulate characterized by strength and free-flowing properties, even though the core has not melted through. The granulator can operate in such a way that the elements enveloping and cutting the strand together rotate at roughly the same speed as the rotating element.

The preheating zone is best set up only for melting the sheath zone of the staple fiber strip. In like manner, the cooling zone is set up only for cooling and consolidating the melted sheath zone.

BRIEF DESCRIPTION OF THE DRAWING FIGURES

In the following, the invention will be described in greater detail based on the drawing and embodiments. Shown on:

FIG. 1 is a diagrammatic side view of a granulate particle in the form of a cylindrical strand section, wherein the reinforcing fibers are only partially penciled in;

DETAILED DESCRIPTION OF THE DRAWING FIGURES AND PREFERRED EMBODIMENTS

Figure 2:
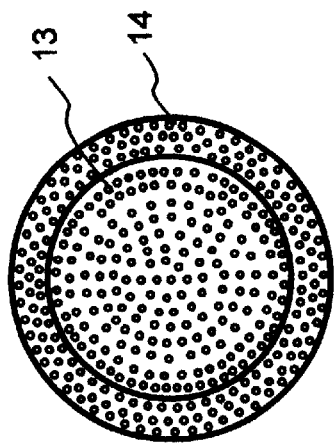
FIG. 2 is the cross section of the granulate particle shown on FIG. 1.
Figure 1:
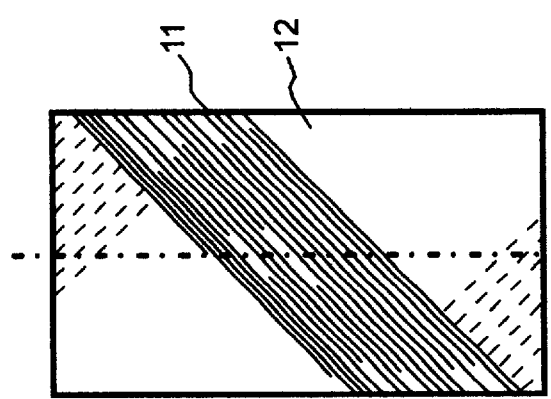

As evident from FIG. 1, the reinforcing fibers 11 are arranged in a helical thread in the section, wherein the fibers 11 are embedded in the melted matrix material 12 in the sheath zone. FIG. 2 shows a cross section of the core 13 comprised of reinforcing fibers and thermoplastic matrix fibers, and a sheath 14 having reinforcing fibers 11 in a melted matrix material 12.

Figure 3:
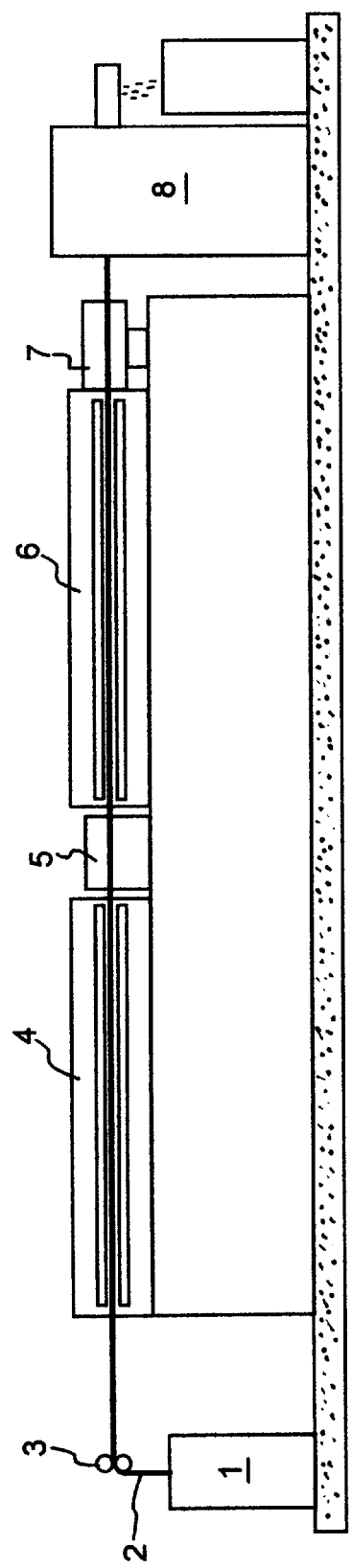
FIG. 3 is a diagrammatic view of the device according to the invention for manufacturing the continuous fiber granulate.

In FIG. 3, the device comprises a storage tank 1, from which the fiber strip 2 comprising thermoplastic matrix fibers and reinforcing fibers is fed to a preheating zone 4 via withdrawal rolls 3. In the preheating zone 4, the matrix fibers are melted within a sheath zone of the strip. In this case, less energy is required as during complete melting, and the strand rate can be accelerated. After leaving the preheating zone 4, the heated material strand passes through a heated nozzle 5, which effects a calibration of the strand cross section. The strand then passes through a cooling zone 6 to further cool and consolidate the matrix material. The strand is rotated at the end of the cooling zone 6 by a combined withdrawal and rotating element 7. The core piece of the combined withdrawal and rotating element 7 is comprised of rolls that rotate against each other to withdraw the strand located between them and rotate around the strand axis for twisting purposes. The design of such a combined twisting unit is known from the textile industry, and has been described in the literature (W. Wegener, "Die Streckwerke der Spinnereimaschinen" (Drawing Equipment in Spinning Frames).

The rotation of the material strand extends from the rotating element 7 through the cooling zone 6 up to the heating nozzle 5, and is limited by the friction against the nozzle wall. The strand is cut into granulate particle (continuous fiber granulate) sections using a granulator 8. In this case, the design of the granulator ensures that the strand can also rotate freely during the cutting process. The generated granulate particles have a core-sheath structure (consolidated sheath/fiber material in core). The strand can be twisted in a defined manner in a continuous procedure using this device.

Embodiment 1

A fiber strip comprising flax and polypropylene fibers with a band fineness of 10 ktex, an average fiber length of the flax and polypropylene fibers of 60 mm and a flax fiber content of 30%w/w is heated to a temperature of 250° C. in the preheating passage of the system shown on FIG. 3. After leaving the preheating passage, the fiber strip passes through a nozzle heated to 250° C. with a diameter of 5 mm . After exiting the nozzle, the fiber strand passes through a downstream cooling passage, and is torqued at 50 revolutions per meter at the end of the cooling zone by a combined withdrawal and rotating element. Finally, the material strand is cut into pellets with a length of 20 mm using a granulator.

Embodiment 2

A fiber strip comprising hemp and polypropylene fibers with a band fineness of 8 kt ex, an average fiber length of 40 mm and a hemp fiber content of 20%w/w is heated to a temperature of 230° in a preheating passage by way of hot air. After leaving the preheating passage, the fiber strip passes through a nozzle heated to 230° C. with a diameter of 4 mm. After exiting the nozzle, the fiber strand passes through a cooling passage for consolidating the melted sheath zone, and is torqued at 30 revolutions per meter by a combined withdrawal and rotating element. The strand is then cut into pellets with a length of 10 mm using a granulator.

Embodiment 3

A continuous fiber granulate comprising a fiber mixture of glass reinforcing fibers and polyamide matrix fibers according to the invention with a glass fiber content of 40%w/w, a granulate diameter of 3 mm, a cut length of 10 mm, and a rotation of 50 revolutions per meter is processed on an injection molding machine. The homogeneous distribution of the reinforcing fibers and helical fiber arrangement makes it possible to meter in large reinforcing fiber lengths and manufacture mold units with a uniform reinforcing fiber distribution in the polyamide mass.

Embodiment 4

A continuous fiber granulate comprising a fiber mixture of flax reinforcing fibers and polypropylene matrix fibers with a flax fiber content of 30%w/w, a granulate diameter of 6 mm, a cut length of 25 mm, and a rotation of 40 revolutions per meter is melted on a screw plasticising unit. A material is subsequently placed in a press with the plasticising unit and pressed into a large-surface mold part. The helical fiber arrangement makes it possible to meter in a large reinforcing fiber length with no problem. In addition, the uniform distribution of the reinforcing fibers makes it possible to achieve a uniform fiber content in the entire molding.

What is claimed is:

1. A continuous fiber granulate, comprising:
    granulate particles having reinforcing staple fibers helically arranged in a thermoplastic matrix, said reinforcing staple fibers being located in a sheathed zone of said granulate particles along with a melted matrix material, said granulate further including a core zone having unmelted thermoplastic staple fibers.

2. The continuous fiber granulate according to claim 1, wherein said granulate particles are strand sections with said reinforcing staple fibers having a length which is greater than a length of said strand sections.

3. The continuous fiber granulate according to claim 1, wherein said reinforcing staple fibers are natural fibers.

4. The continuous fiber granulate according to claim 1, wherein said reinforcing staple fibers are synthetic fibers.

5. The continuous fiber granulate according to claim 1, wherein said reinforcing staple fibers are mineral fibers.

6. The continuous fiber granulate according to claim 1, wherein said granulate particles have a diameter of from 1 to 10 mm.

7. The continuous fiber granulate according to claim 1, wherein the percentage of said reinforcing staple fibers in said granulate particles in from 10 to 80%w/w.

8. The continuous fiber granulate according to claim 1, wherein said thermoplastic matrix are made of a material selected from the group consisting of polypropylene, polyethylene and polyamide.

9. A method for manufacturing a continuous fiber granulate out of a staple fiber mixture, said continuous fiber granulate comprising:
    granulate particles having reinforcing staple fibers helically arranged in a thermoplastic matrix, said reinforcing staple fibers being located in a sheathed zone of said granulate particles along with a melted matrix material, said granulate further including a core zone having unmelted thermoplastic staple fibers, said method for manufacturing said continuous fiber granulate comprising the steps of:
    preheating a fiber strip comprised of a staple fiber mixture of thermoplastic fibers and reinforcing fibers;
    extruding said fiber strip through a heating nozzle into a strand;
    cooling said strand exiting said heating nozzle;
    rotating and withdrawing said strand from said cooling step; and
    freely rotating said strand while cutting said strand into continuous fiber granulate sections, without impediment, thereby producing said continuous fiber granulate.

10. The method for manufacturing a continuous fiber granulate out of a staple fiber mixture according to claim 9, wherein said thermoplastic fibers of said fiber strip are melted in a sheath area in said preheating step.

11. The method for manufacturing a continuous fiber granulate out of a staple fiber mixture according to claim 9, wherein said rotating and withdrawing step is carried out with a ratio of speed to withdrawal rate ranging from 10 to 150 revolutions per meter.

12. The method for manufacturing a continuous fiber granulate out of a staple fiber mixture according to claim 9, wherein a percentage of said reinforcing fibers of said fiber strip ranges from 10 to 80 %w/w.

13. The method for manufacturing a continuous fiber granulate out of a staple fiber mixture according to claim 9, wherein an average reinforcing fiber length in said fiber strip ranges from 30 to 200 mm.

14. The method for manufacturing a continuous fiber granulate out of a staple fiber mixture according to claim 9, wherein a fineness of said fiber strip ranges from 5 to 30 ktex.

15. The method for manufacturing a continuous fiber granulate out of a staple fiber mixture according to claim 9, wherein said granulate particles are strand sections with said reinforcing staple fibers having a length which is greater than a length of said strand sections.

16. The method for manufacturing a continuous fiber granulate out of a staple fiber mixture according to claim 9, wherein said reinforcing staple fibers are natural fibers.

17. The method for manufacturing a continuous fiber granulate out of a staple fiber mixture according to claim 9, wherein said reinforcing staple fibers are synthetic fibers.

18. The method for manufacturing a continuous fiber granulate out of a staple fiber mixture according to claim 9, wherein said reinforcing staple fibers are mineral fibers.

19. The method for manufacturing a continuous fiber granulate out of a staple fiber mixture according to claim 9, wherein said granulate particles have a diameter of from 1 to 10 mm.

20. The method for manufacturing a continuous fiber granulate out of a staple fiber mixture according to claim 9, wherein the percentage of said reinforcing staple fibers in said granulate particles in from 10 to 80 %w/w.

21. The method for manufacturing a continuous fiber granulate out of a staple fiber mixture according to claim 9, wherein said thermoplastic matrix are made of a material selected from the group consisting of polypropylene, polyethylene and polyamide.

* * * * *